Figure 1:
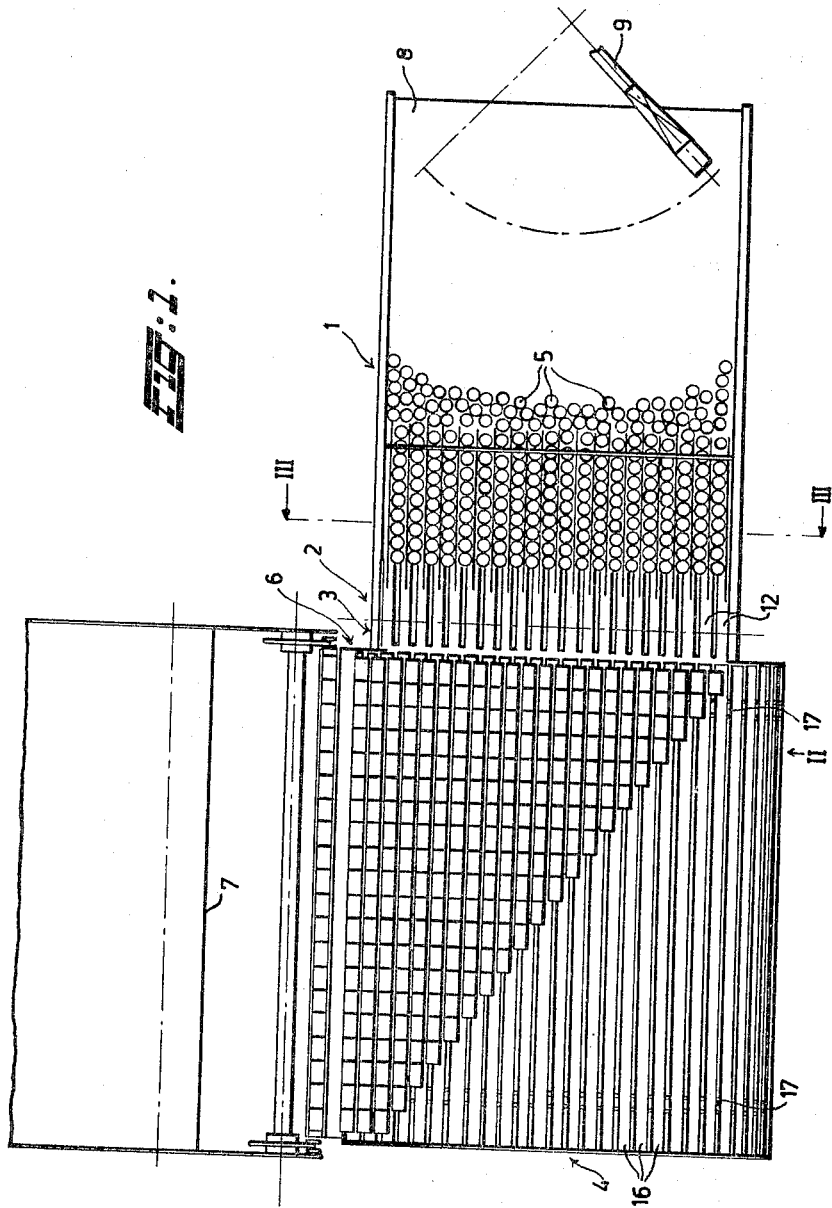

United States Patent Office 3,319,763
Patented May 16, 1967

3,319,763
DEVICE FOR TRANSFORMING THE RELATIVE POSITION OF A NUMBER OF CONTAINERS
Johannes B. van der Winden, Amstelveen, Netherlands, assignor to Gebr. Stork & Co's Apparatenfabriek N.V., Amsterdam, Netherlands
Filed Dec. 10, 1964, Ser. No. 417,295
Claims priority, application Netherlands, Dec. 13, 1963, 301,766
12 Claims. (Cl. 198—33)

The invention relates to a device for transforming the relative position of a number of containers and for periodically discharging said containers in groups in a position different from that in which they are supplied. This discharge in groups is effected, for example, onto the conveyor of an installation for thermal treatment of the containers.

Various embodiments of such a device is known in the art, whereby the containers due to their previous treatment (for instance filling and closing the containers) are fed in a definite position, which is inconvenient for a subsequent treatment, e.g. sterilization. Thus, for instance an installation is known wherein a chute with a bend is used in such a way that the containers leave the chute in a relative position which differs from the position in which they enter the chute. Such an installation, however, has a small capacity, since the containers cannot be fed at too fast a rate to the chute owing to the fact that in that case every container would hinder the transformation of the position of the preceding one.

According to another known construction a free fall of the containers is employed in order to change their relative position at a fast rate. Although very favorable results are obtained with this known installation, disturbances may be produced in the rapid succession of movements owing to minor differences in size or the weight of the container. This may result in the interruption of the operation of the installation. A decrease of this fast operative rate produces a corresponding decrease of the capacity of the installation.

Another drawback of the latter known installation is that it is only capable of use with metal containers or tins and it is not adapted for use with glass.

It is an object of the invention, to provide an installation which delivers at short intervals rows of containers which have a relative position differing from the position in which they are supplied. This object is attained according to the invention by the combination of:

(a) At least one device for feeding the containers in an upright position and for pushing against said containers in juxtaposition, the number of the said containers corresponding with those of the periodically discharged rows, (b) At least one mechanism for periodically tilting this number of containers by a quarter turn in the supply direction, and for subsequently positively moving the tilted containers in the feed direction over a distance which is equal to the dimension of the containers in this direction, (c) Means for advancing the positively moved containers in a direction transverse to the feed direction in such a manner, that between two successive positive movements, the containers are moved in transverse direction over a distance which is equal to the distance between the centerlines of adjacent containers in this direction.

With such an installation it is possible to keep the rate at which every separate container is handled, very slow, while per time unit a great number of containers become periodically available for discharge to a further treatment station. Due to the slow rate at which every separate container is handled, the system is practically immune to disturbances. A considerable operative capacity of the installation is nevertheless obtained due to the large number of containers which per time unit become groupwise available.

Due to the features of the invention the transformation of position of every individual container is no longer consecutively effected, but simultaneously in the desired number which periodically should be available in the transformed position, so that the rate of the successively required operations is correspondingly reduced in respect of the known installations.

It is a further object of the invention to obtain an adaptation in a simple manner of the transport path and of a part of the preceding transport, if any, of the containers to the circumstances which may depend for instance on the size of the containers.

The invention further aims at reducing the time required for the transformation of the position of each container from the supply position to the discharge position.

Figure 2:
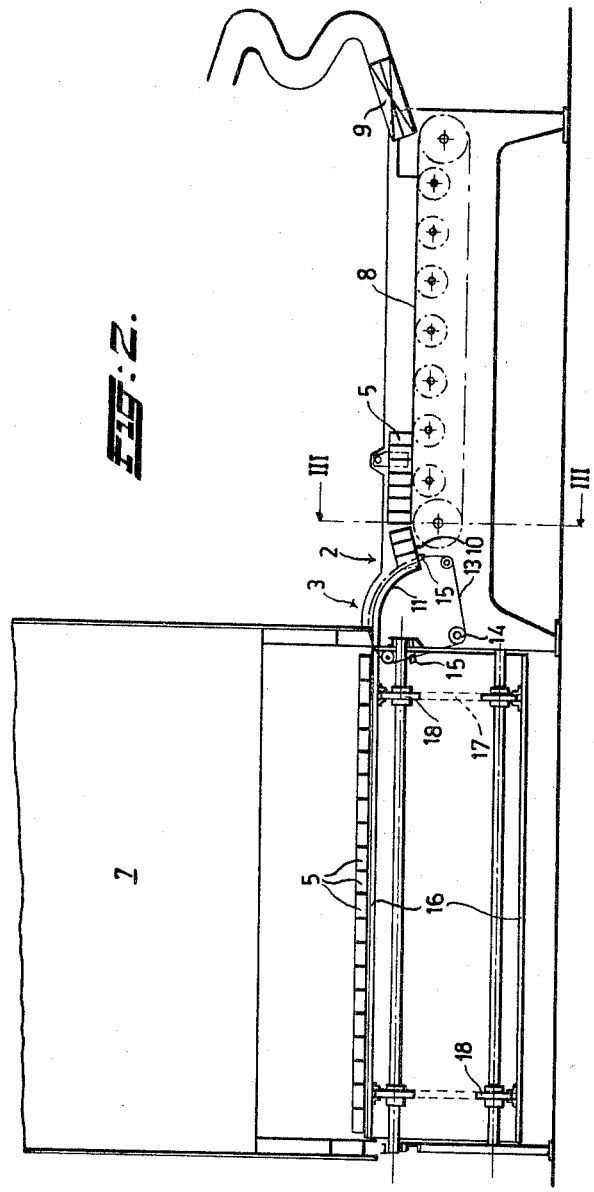
Figure 3:
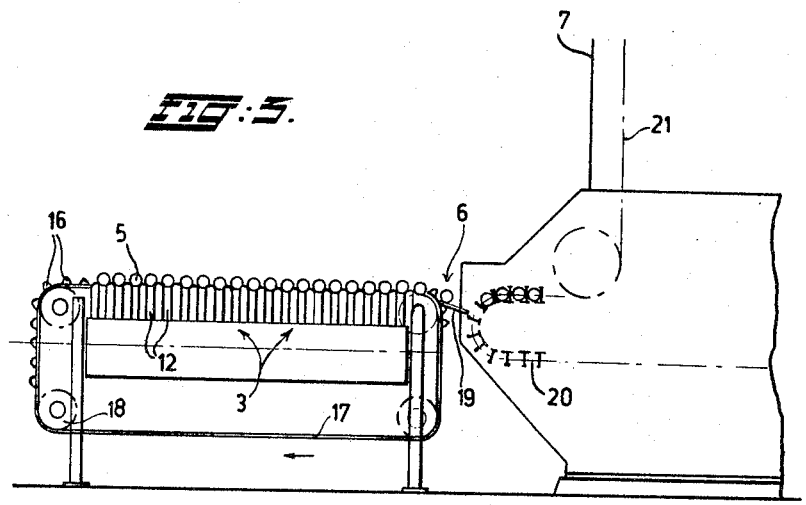
Figure 4:
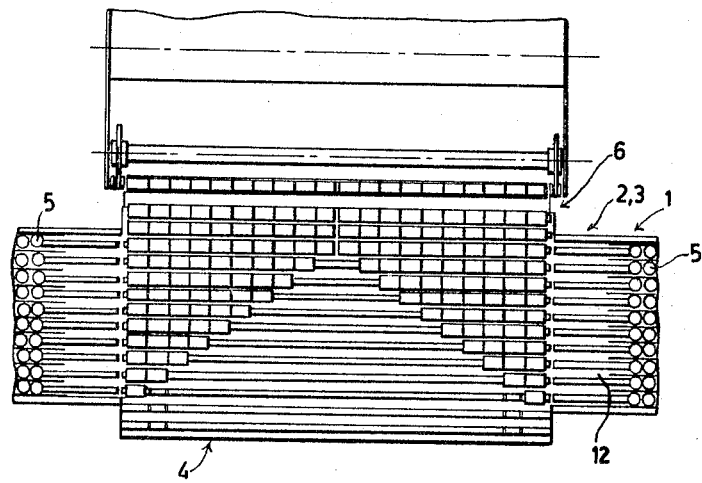

The invention will hereinafter be clarified with reference to the accompanying drawing in which two embodiments of the device according to the invention are shown. Each embodiment shows how juxtaposed tins, filled with food and initially in upright position, are fed to an installation for the sterilization or pasteurization of the contents of the said tins in a position in which a number of tins are fed step wise on their sides in end-to-end relation in a row. In the drawing:

FIG. 1 is a plan view of a first embodiment of the installation, according to the invention, FIG. 2 is a front view in the direction of the arrow II—II in FIG. 1, FIG. 3 is a sectional view taken along line III—III in FIG. 2, and FIG. 4 is a plan view of a second embodiment of the installation according to the invention.

As seen in FIG. 1 the installation comprises a feeder 1, a mechanism 2, 3 for tilting and positively moving the containers 5 and means 4 for advancing in transverse direction the containers 5, which in this case are cylindrical tins containing food to be preserved. The installation further comprises discharge means 6 for conveying the tins onto an installation 7 (only partially shown) for the sterilization or pasteurization of the contents of the tins 5.

The feeder 1 consists of an endless belt 8 which advances continuously in the direction of the means 4. The containers 5 are supplied to this belt 8 by means of an oscillating supply device 9, which ensures a regular distribution of these containers on the belt 8. Due to the advance of the belt 8, the containers 5 are moved toward the tilting mechanism 2, which in this case consists of a downwardly inclined surface 10, leading to guide means 11, consisting of a plurality of bent gullies 12 situated beside one another.

In the installation shown it is contemplated to transform the position of every twenty juxtaposed containers 5, so that there are also provided twenty bent gullies 12. The containers 5 of the leading row on the belt 8 will on reaching the inclined surface 10 bear with their side wall on the gullies 12. The tilting aimed at is hereby already partially initiated.

The second part of the tilting movement is effected by the postive conveying mechanism 3, which is composed of two endless belts or chains 13, situated on either side of the tilting mechanism 2. These belts run over rollers 14 and further along the guide means 11. The two belts 13 are interconnected at two or more locations by a rod 15, which is provided in such a way that it just can contact the leading row of containers 5 on the inclined surface 10. During the advance of the belts 13, a row that is to say in this case twenty containers 5, will be elevated along the guide means 11 until these containers contact the containers 5, which are already situated on the means 4. The contact between each rod 15 and the row of containers 5 concerned is maintained for a time which is sufficient to ensure that the said row of containers push forward the containers 5 being already on the means 4 over a distance, which is equal to the extent of the containers 5 in this direction of transport.

The means 4 for advancing the containers in a direction transverse to the direction of feed consist of a row of gully shaped supports 16, which are interconnected by two belts or chains 17, the latter moving in a closed circuit past rollers 18. One or more of the rollers 18 is driven in such manner in respect of the velocity of the belts 13 and the distance between two consecutive rods 15, that between two passages of a rod 15 the containers, bearing on the gully shaped supports 16, are moved over a distance which is equal to the distance between the centerlines of adjacent rows of containers in this direction of transport.

As is visible in FIGURE 3 an inclined surface 19 adjoins the belts 17 in the direction of motion thereof, the said surface serving for the discharge of the containers and being disposed in such a way that always a row of containers (in this case twenty tins at the same time) glide from their shaped support 16 and by way of this surface 19 land in a bearer 20 of a conveyor 21 of the installation 7 for thermal treatment of the containers.

The operation of the installation for transforming the relative position of a number of containers according to the described embodiment as represented in FIGURES 1–3 can be summarized as follows:

Due to the advance of the belt 8, the containers 5 deposited thereon by way of the feeding device 9, are advanced in the direction of the inclined surface 10, the leading row of containers being stopped by the gullies 12. On passing of a rod 15, the foremost row of containers is now periodically conveyed in an upward direction and deposited on the gully shaped supports 16, the containers lying already on these supports being simultaneously displaced. Since the supports 16 advance in a transverse direction (e.g. stepwise) a triangular array as depicted in FIGURE 1 is obtained. At the location of discharge 6 as many containers 5 are now available as at the tilting mechanism 2, but the relative position of the row of containers has now been transformed. That is, initially as shown in FIG. 2, the containers were upright whereas upon discharge at installation 7 they are on their sides. Discharge towards the installation 7 is effected in a position as required for further treatment.

In the modified embodiment according to FIGURE 4 the pushing device 1, the tilting mechanism 2 and the mechanism for positive displacement 3 are not only provided on one side, but on either side of the means 4 for advancing the containers 5 in transverse direction, so that a double triangular array of the containers on the means 4 is formed. In principle this embodiment functions in a way which is identical to that of the installation according to FIGURES 1–3, the length of the distance covered by the containers 5 on the means 4 being half of that according to the situation as represented in FIGURE 1. This is advantageous under certain circumstances, e.g. when there is lack of space or when there are two separate feeders for the containers whose relative position is to be transformed.

The combination of features of the installation according to the invention is advantageous in that the rate at which every individual container 5 is moved is rather slow, nevertheless a large group of containers in a transformed position is always available for further treatment at short intervals.

It should be noted that the positive displacement mechanism 3 may also be composed of a number of members, mounted on a common shaft, which during their rotation may pass through recesses in the end of the surface 10 and through slots in the gullies 12.

When in an existing installation a smaller size container is to be treated, for instance tins of half the height, the positive displacement mechanism 3 can be constructed in such a way that between two consecutive movements of the supports 16 two rows of containers at a short interval are moved upwardly along the gullies 12 and slided onto the supports 16. The same redoubling can also be applied in the event of the large size container, but in that case only half the number of gullies 12 should be used.

The installation according to the invention is also suitable for dealing with containers of arbitrary height, inasmuch as by combination of the two following factors:

(a) Supply of one or more rows of containers to the support 16 in the period between two consecutive movements of these supports,
(b) Closing of one or more gullies 12, it is possible to obtain any desired row of containers on the extreme right support 16 in FIGURE 3 allowing for the adaptation to the length of the bearer 20 in the installation 7.

What I claim is:

1. A device for transforming the relative position of a number of containers and for periodically discharging said containers in rows in an orientation which is different from that in which they are supplied, the length of the supplied as well as of the discharged rows being directed transverse to the respective directions of movement, said device comprising: at least one device for feeding the containers in upright position and for advancing said containers in a plurality of rows, the number of containers in each row corresponding to that of the periodically discharged rows, at least one mechanism for periodically tilting the foremost row of containers by a quarter turn in their direction of advancement and for subsequently positively displacing the tilted containers in their direction of advancement over a distance at least equal to the dimension of the containers in this direction, and means for advancing the positively displaced containers in a direction transverse to the feed direction such that between two successive positive movements, the containers are advanced in transverse direction over a distance which is equal to the distance between the center lines of two adjacent rows of containers in said transverse direction, the latter means comprising rows of supports, which are stepwise driven over a distance which is equal to the distance between the center lines of adjacent supports.

2. A device as claimed in claim 1, wherein on either side of the means for advancing the containers in transverse direction there are provided an advancing device, a tilting mechanism and a positive displacement mechanism.

3. A device as claimed in claim 1, wherein said supports are gully-shaped.

4. A device for changing the orientation of containers comprising means for feeding a plurality of containers in a longitudinal direction in successive rows of equal number, a transversely movable conveyor, means for successively receiving the foremost row of containers and rotating the same 90°, and depositing the thus rotated containers on the transversely movable conveyor such that successive rows of containers when deposited on the conveyor cause transverse displacement of all containers already on the conveyor by a distance equal to the height of a container and means for the stepwise advance of said conveyor, once for each deposit of a foremost row of containers thereon whereby the containers are advanced on the conveyor in a triangular array.

5. A device as claimed in claim 4, comprising a second feeding means disposed on a side of the conveyor opposite the first said feeding means so that a double triangular array is formed.

6. A device as claimed in claim 4, comprising means for the stepwise advance of said conveyor, once for each deposit of a foremost row of containers thereon.

7. A device as claimed in claim 4, wherein said feeding means and said conveyor include respective partitions for maintaining said containers in said rows thereon.

8. A device as claimed in claim 4, wherein said means for rotating the foremost row of containers 90° comprises first means for initially tilting the containers and second means for engaging the containers thus tilted and displacing the same for deposit onto the conveyor, said first means comprising a portion with an inclined surface on which said containers are fed, said second means comprising a transverse rod, and means for driving said rod along a determinable path in which the rod engages the containers of the foremost row to displace the same therewith.

9. A device as claimed in claim 8, wherein said second means comprises guide means for supporting the containers as they are displaced by the rod.

10. A method of transforming the position of a plurality of articles comprising feeding a plurality of articles in upright position in a longitudinal direction in a plurality of rows, successively engaging the articles in the foremost row and rotating the same 90° to a position on their sides while feeding the articles thus rotated onto a transversely advancing member such that successive rows of articles transversely displace all articles already present on the transversely advancing member by a distance equal to the height of an article, and moving the transversely advancing member stepwise, once for each feeding of the articles thereon whereby the articles are advanced on the transversely advancing member in triangular array and the articles in the rows thereof are in end-to-end relation.

11. A method as claimed in claim 10, wherein the foremost row on the transversely advancing member has an equal number of articles as the foremost row in the longitudinally advancing rows.

12. A method of transforming the position of a plurality of articles comprising feeding a plurality of articles in upright position in a longitudinal direction in a plurality of rows, successively engaging the articles in the foremost row and rotating the same 90° to a position on their sides while feeding the articles thus rotated onto a transversely advancing member and transversely displacing all the articles on the transversely moving member by a distance equal to the height of an article by the articles successively fed onto said member, and advancing the transversely moving member stepwise once for each feeding of the articles thereon such that the rows of the longitudinally advancing articles fed to the transversely moving member form columns thereon having diminishing length in a direction away from the longitudinally advancing articles to define a triangular array on the transversely moving member in which the articles are in end-to-end relation in each row thereon.

References Cited by the Examiner

UNITED STATES PATENTS

| 2,840,220 | 6/1958 | Antonelli | 198—32 |
| 2,935,173 | 5/1960 | Cozzoli | 198—30 |

FOREIGN PATENTS

| 713,116 | 8/1954 | Great Britain. |
| 20,062 | 6/1929 | Netherlands. |

EVON C. BLUNK, *Primary Examiner.*

R. E. AEGERTER, H. O. SCHULZ, *Assistant Examiners.*